Feb. 23, 1971 T. F. HOGLUND 3,566,251
SERIES FIELD FOR PERMANENT MAGNET MACHINE
Filed May 6, 1968

WITNESSES:
Bernard R. Gagnon
E. Strickland

INVENTOR
Thor F. Hoglund
BY
ATTORNEY

United States Patent Office 3,566,251
Patented Feb. 23, 1971

3,566,251
SERIES FIELD FOR PERMANENT MAGNET MACHINE
Thor F. Hoglund, East Amherst, N.Y., assignor to Westinghouse Electric Corporation, Pittsburgh, Pa., a corporation of Pennsylvania
Filed May 6, 1968, Ser. No. 726,737
Int. Cl. H02p 9/40; H02k 21/26
U.S. Cl. 322—46         5 Claims

ABSTRACT OF THE DISCLOSURE

A dynamoelectric machine having permanent magnet field poles subject to demagnetization due to armature reaction, and field coils disposed on said poles and electrically associated with said armature to provide cumulative ampere-turns to counteract said demagnetization as a function of armature current and machine load.

BACKGROUND OF THE INVENTION

This invention relates to improvements in permanent magnet dynamoelectric machines and particularly to a means for reducing the permanent loss of magnetism by use of a cumulative magnetic field.

When a permanent magnet motor or generator is placed under load, armature reaction or field distortion has a tendency to permanently demagnetize the permanent magnet field poles, the amount of flux loss in general depending upon the amount of load applied. If a counteracting cumulative magnetomotive force (hereinafter termed MMF) is added to the MMF of the permanent magnet pole, the amount of demagnetization caused by armature distortion will be less, or, the amount of load can be increased to give the same amount of demagnetization as previously experienced without the counteracting MMF.

If a series field coil is disposed on the permanent magnet pole and connected to the armature winding so that armature current is used to produce the cumulative MMF in the coil and pole, the degree of counteracting MMF produced will be in direct proportion to the load.

It is therefore an object of the invention to provide a dynamoelectric machine having permanent magnet poles that do not substantially lose their residual magnetism under load conditions.

Another object of my invention is to greatly reduce the demagnetizing effect of armature reaction on permanent magnet poles by a simple and inexpensive means.

Yet another object of the present invention is to reduce demagnetization of a permanent magnet pole by armature reaction for both directions of armature rotation and current reversal.

Still another object of the invention is to provide a permanent magnet machine in which the demagnetizing effect of the armature on the permanent magnets under load conditions is controlled by a field flux dependent upon load conditions.

BRIEF SUMMARY OF THE INVENTION

The present invention accomplishes these and other objects by providing permanent magnet salient poles for the field structure of a dynamoelectric machine with a field winding disposed around each pole and connected in series with the armature winding. The field winding may be so connected that total armature current flows therethrough or the field may obtain its excitation from a voltage source dependent on armature current such as a voltage dropping resistor. The field winding is connected and disposed in such a manner on the permanent magnet pole that its ampere-turns are directed in the same or cumulative direction as the MMF in the permanent magnet pole. The cumulative ampere-turns produced by the field winding strengthens the magnetomotive force of the pole to counteract the demagnetizing flux of armature reaction when the machine is placed under predetermined load and overload conditions. The counteracting effect of the field winding is thus dependent on load conditions since the winding produces the counteracting MMF only when current flows in the armature and in amounts proportional to the amount of current flowing in the armature.

THE DRAWING

Other objects and advantages of the invention will be apparent from the following detailed description taken in connection with the accompanying drawings, in which.

PREFERRED EMBODIMENTS

Figure 1:
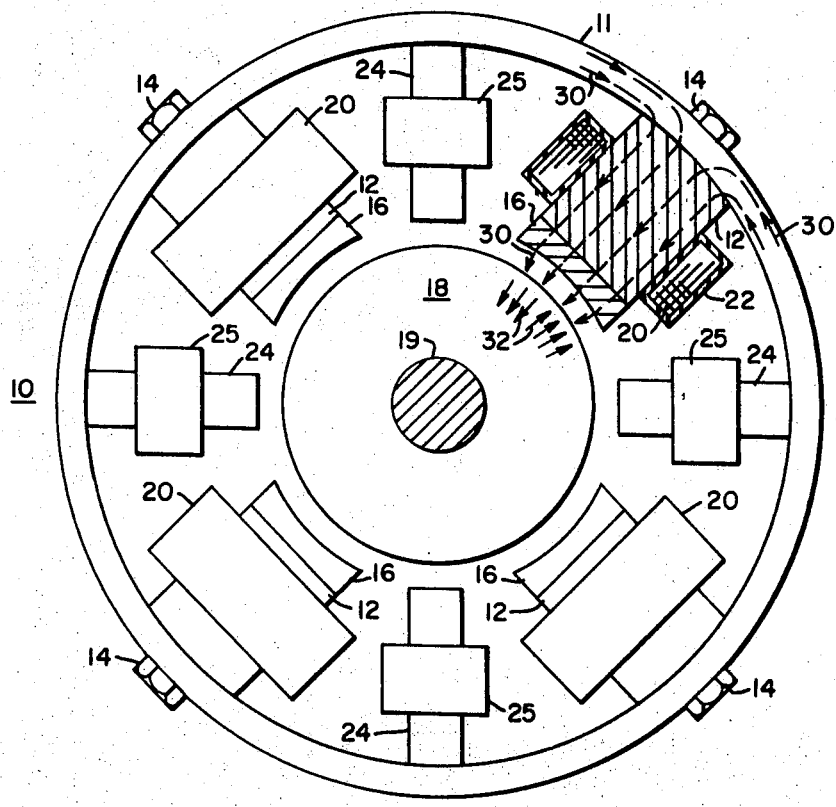
FIG. 1 is an end elevation view of a salient pole dynamoelectric machine constructed in accordance with the principles of the invention with one salient pole being shown in cross section.

In the drawing, like reference numerals are used throughout to designate like parts. In FIG. 1, there is shown a motor or generator 10 having a yoke or frame member 11 with four main salient field poles 12 attached thereto. The poles can be secured by bolts 14 as shown, or by other suitable means. The poles 12 are made of any suitable permanent magnet material and are permanently magnetized to provide the main field flux for the machine. The poles 12 have attached thereto a pole tip or shoe 16 in any convenient manner, the face of which may be curved in a suitable manner about the periphery of an armature generally designated as 18, the armature being suitably attached to a shaft 19.

In addition to the main poles 12, the machine 10 is provided with commutating poles or interpoles 24 disposed at spaced intervals between the main poles, the commutating poles having commutating field windings 25 supported thereon. The construction of the machine 10 may be generally similar to that shown in Smith et al. Pat. 3,201,625.

Figure 2:
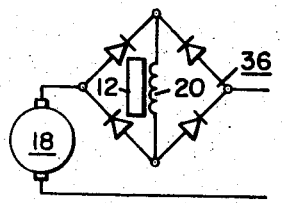
FIG. 2 is an electrical schematic representation of the invention using a diode bridge.
Figure 3:
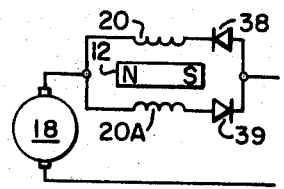
FIG. 3 is an electrical schematic diagram showing a second embodiment of the invention.
Figure 5:
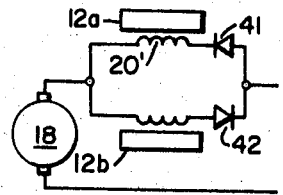
FIG. 5 is an electrical schematic diagram showing a fourth embodiment of the invention.

In accordance with the invention, at least one field coil 20 is disposed around the shank portion of each of the field poles 12 and serially or otherwise connected to conduct armature current or an exciting current proportional thereto. In FIGS. 2, 3 and 5, the field coil 20 is shown schematically connected to carry total armature current though the invention is not limited thereto.

The field coil 20 is shown insulated from the field pole by a suitable insulated housing or wrapping 22.

In FIG. 1, one of the main poles 12 and its associated field coil 20 are shown in cross section to indicate diagrammatically the general nature of machine MMF. In each of the main permanent magnet poles 12 is generated an MMF which produces magnetic flux as indicated by dashed arrow lines 30 extending from the machine frame 11 through the pole bodies to the armature 18. When the machine 10 is loaded or overloaded the armature current produces an MMF of its own, commonly called "armature reaction," which both aids and opposes the MMF existing in the main poles as indicated diagrammatically by the short arrow lines 32 depicted on the armature. The net effect of the armature MMF on the main poles is differential so that the main poles tend to be demagnetized as a result thereof, the amount of flux loss in the poles depending upon the amount of the load on the machine.

To overcome the demagnetization caused by armature reaction, the field coils 20 are disposed on the poles 12 and connected to be excited by armature current or by a voltage dependent on armature current to produce ampere-turns or an MMF which adds to the MMF ordinarily developed and existing in the poles. Thus, the two MMF's are additive or cumulative in the bodies of the poles 12, and are effective to substantially reduce the demagnetizing effects of armature reaction.

In cases where there is armature current reversal, the field winding 20 would produce flux in a differential direction, thereby tending to demagnetize the permanent magnet pole 12. That is, under reverse conditions, such as when the motor is being dynamically braked, the winding 20 would produce MMF in a direction opposite to that of flux lines 30 in the pole 12, and this differential MMF would cause substantial demagnetization of the permanent magnet poles. For this reason a rectifying device or devices may be used to either conduct reverse current flow through the rectifier instead of the series field winding 20 or to limit current flow therethrough to the ampere-turn aiding direction. Such a circuit is shown in FIG. 2 in which a diode bridge 36 is connected across the field winding 20, the bridge limiting the direction of current flow through the field winding in the manner last described.

In FIG. 3 is shown a schematic representation of a second embodiment of the invention in which reverse current flow is employed in an additive manner in the main poles 12. This is accomplished by use of a second, oppositely wound field winding 20A, which can be disposed on the poles in the manner of the winding 20, and two diodes 38 and 39 connected oppositely in respective series with the windings. The diodes function to block current flow in the direction that would cause demagnetization of the poles and permit current flow through the winding creating a cumulative MMF in the poles.

Figure 4:
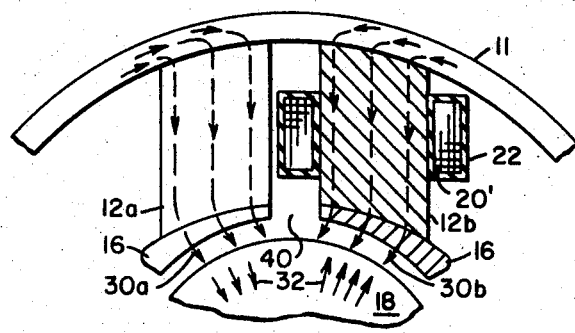
FIG. 4 is a partial cross sectional view of a third embodiment of the invention.

In FIG. 4, an embodiment of the invention is shown in which each pole piece 12 is divided into two sections 12a and 12b with a field winding 20' shown disposed on the right-hand section 12b for purposes of illustration. The flux lines in each section of the pole 12 are shown as 30a and 30b respectively. The armature reaction is depicted as arrow lines 32 in the manner shown in FIG. 1.

In operation, with armature current in a predetermined direction, the armature MMF will produce a cumulative magnetizing effect on the pole section 12a while on the pole section 12b the effect will be differential thereby tending to demagnetize that section in the manner explained above in connection with the undivided pole of FIG. 1.

In a similar manner, the field winding 20' will provide cumulative ampere-turns in the pole section 12b as a function of armature current with the winding being excited by, or a voltage dependent upon, the current in the armature 18.

In the embodiment depicted in FIG. 4 only the pole section 12b is provided with a field winding. Obviously, the pole section 12a may be similarly provided as shown schematically in FIG. 5.

With the use of a series field winding on each section of the divided pole shown in FIG. 4, one field winding will produce a demagnetizing flux with armature rotation and current flow in one of the two possible directions for rotation and current flow. In order to essentially disable the one series winding causing demagnetization, rectifying diode means 41 and 42 may be connected in series with the two series field windings (FIG. 5) like that shown in FIG. 3, the diodes being connected to conduct current only in the direction creating cumulative ampere-turns. With this type of arrangement the direction of armature current flow is immaterial since the diodes are connected to block current flow in the direction that would cause demagnetization in the pole sections 12a and 12b.

In order to prevent pole sections 12a and 12b from demagnetizing each other, an air gap 40 is provided in the pole shoe 16 as shown in FIG. 4.

While there has been shown and described certain preferred embodiments of the invention, modifications thereto will readily occur to those skilled in the art. For example, the invention is not limited to four pole structures as shown in FIG. 1. Further, in connection with the circuit diagram of FIGS. 3 and 5, it should be understood that the field windings may be connected in series with each other with the blocking diodes connected across each of the field windings. Also the field windings need not be disposed on the shank portion of the field pole 12 but may be disposed upon the shoe portion 16 of the pole without departing from the spirit and scope of the invention. Thus the invention is not limited to the specific arrangements shown and described, but is intended to include all modifications which fall within the spirit and scope of the invention.

I claim as my invention:

1. A dynamoelectric machine comprising:
   a frame,
   a plurality of permanent magnet field poles attached thereto,
   an armature disposed in the center of said frame and said poles, said armature subjecting said poles to a demagnetizing magnetomotive force under load conditions,
   field windings disposed on said poles and electrically connected to be excited proportionally to current flow in said armature,
   said field windings producing a cumulative magnetomotive force in the pole pieces in opposition to the demagnetizing magnetomotive force as a function of armature current.

2. The machine described in claim 1 in which the field windings are connected in series with the windings of the armature.

3. The machine described in claim 1 in which diode means are connected to the field windings in such a manner that current reversals in the armature are conducted through the field windings in a direction providing the cumulative magnetomotive force.

4. The machine described in claim 1 in which each of the field poles is provided with at least two oppositely wound field windings and a diode means connected in the circuit of each field winding and oppositely poled with respect to each other.

5. The machine described in claim 1 in which the field poles are longitudinally divided into two sections, and a field winding disposed on the section in which demagnetization occurs with a predetermined direction of armature rotation and reaction.

References Cited

UNITED STATES PATENTS

| | | | |
|---|---|---|---|
| 2,038,380 | 4/1936 | Pestarini | 310—187X |
| 3,214,620 | 10/1965 | Smith et al. | 310—181 |
| 3,427,484 | 2/1969 | Karlby et al. | 310—181X |

ORIS L. RADER, Primary Examiner

H. HUBERFELD, Assistant Examiner

U.S. Cl. X.R.

310—68, 154, 181, 187; 322—52